US006960242B2

(12) United States Patent
Leitch et al.

(10) Patent No.: US 6,960,242 B2
(45) Date of Patent: Nov. 1, 2005

(54) $CO_2$ RECOVERY PROCESS FOR SUPERCRITICAL EXTRACTION

(75) Inventors: Kelly Leitch, Nampa, ID (US); Gavin Hartigan, Bradford, MA (US); Robert D'Orazio, Livermore, CA (US)

(73) Assignee: The BOC Group, Inc., Murray Hill, NJ (US)

( * ) Notice: Subject to any disclaimer, the term of this patent is extended or adjusted under 35 U.S.C. 154(b) by 173 days.

(21) Appl. No.: 10/671,163

(22) Filed: Sep. 25, 2003

(65) Prior Publication Data

US 2004/0118281 A1 Jun. 24, 2004

Related U.S. Application Data

(60) Provisional application No. 60/415,655, filed on Oct. 2, 2002.

(51) Int. Cl.⁷ .......................... B01D 53/02; B01D 53/26; B01D 53/75
(52) U.S. Cl. .............................. 95/90; 96/134; 55/315.1; 62/606; 62/50.2; 62/928
(58) Field of Search .............................. 95/90, 117, 148, 95/273; 96/108, 121, 134, 143; 55/315.1; 134/1.3; 423/437.1; 62/606, 50.2, 928

(56) References Cited

U.S. PATENT DOCUMENTS

| | | | |
|---|---|---|---|
| 3,420,633 A | 1/1969 | Lee | |
| 4,337,071 A | 6/1982 | Yang | |
| 4,349,415 A | 9/1982 | DeFilippi et al. | |
| 4,717,406 A | 1/1988 | Giacobbe | |
| 4,806,171 A | 2/1989 | Whitlock et al. | |
| 5,028,273 A | 7/1991 | Weltmer, Jr. et al. | |
| 5,339,844 A | 8/1994 | Standford, Jr. et al. | |
| 5,582,029 A | 12/1996 | Occhialini et al. | |
| 5,775,127 A | 7/1998 | Zito | |
| 5,881,577 A | 3/1999 | Sauer et al. | |
| 5,925,326 A | 7/1999 | Kapoor et al. | |
| 6,082,150 A | 7/2000 | Stucker | |
| 6,164,088 A | 12/2000 | Moriguchi et al. | |
| 6,327,872 B1 | 12/2001 | Boyd et al. | |
| 6,361,696 B1 * | 3/2002 | Spiegelman et al. | ........ 210/662 |
| 6,444,011 B2 * | 9/2002 | Li et al. | ........................ 95/45 |
| 6,612,317 B2 | 9/2003 | Costantini et al. | |
| 6,735,978 B1 * | 5/2004 | Tom et al. | .................... 62/606 |
| 2001/0050096 A1 | 12/2001 | Constantini et al. | |
| 2003/0072690 A1 | 4/2003 | Royer et al. | |
| 2003/0161780 A1 | 8/2003 | Howard et al. | |

* cited by examiner

Primary Examiner—Frank M. Lawrence
(74) Attorney, Agent, or Firm—Joshua L. Cohen

(57) ABSTRACT

A carbon dioxide recovery apparatus and process for supercritical extraction includes providing a process stream from a supercritical extraction procedure in which the process stream includes pressurized carbon dioxide, extraction process waste and optionally at least one co-solvent; reducing the pressure of the process stream below critical pressure; venting low pressure carbon dioxide vapor to exhaust; cooling the process stream to form a two phase mixture; separating the two phase mixture into a process liquid, containing co-solvent if present, and a process vapor phase stream; collecting the process liquid; filtering the process vapor phase stream to remove particulates and optionally residual co-solvent; passing the filtered process vapor stream through an adsorber to remove trace impurities to form a purified carbon dioxide vapor stream; and, drying the purified carbon dioxide vapor stream to remove residual water vapor.

16 Claims, 1 Drawing Sheet

# CO₂ RECOVERY PROCESS FOR SUPERCRITICAL EXTRACTION

CROSS-REFERENCE TO RELATED APPLICATIONS

This application claims priority from Provisional Patent Application No. 60/415,655 filed Oct. 2, 2002, which is incorporated herein by reference.

FIELD OF THE INVENTION

The present invention relates to a process and apparatus for recovering carbon dioxide used for supercritical extraction in an industrial process, such as semiconductor wafer cleaning.

BACKGROUND

Supercritical mixtures of high purity $CO_2$ and organic co-solvents, such as ethanol, are used in the production of semiconductor wafers. This includes post-etch cleaning, residue removal, and metal and dielectric deposition. For a commercial process, $CO_2$ flows are large and $CO_2$ needs to be recycled after each wafer production step. $CO_2$ recycle for semiconductor requirements can only be done if the co-solvents and dissolved impurities can be substantially removed from the recycle stream.

For a large-scale chemical production system, the amounts of $CO_2$/co-solvent waste generated are significant. To make the process more economical, $CO_2$ can be recycled, as long as the co-solvent (and other impurities) can be separated from the $CO_2$. To accomplish this, the prior art discloses the use of distillation columns, where the $CO_2$ and the co-solvents are separated. This system will work as long as there are only two major components in the system, namely $CO_2$ and the co-solvent. If trace amounts of other components are present, this process has to be substantially altered with additional equipment, design changes and added expense. Still, the separation of all measurable traces is not always possible with known systems.

Previous processes for recovery of carbon dioxide for reuse in industrial processes such as semiconductor wafer manufacturing require the use of accessory equipment such as boilers and condensers for distilling and condensing the solvent waste stream, together with significant energy requirements.

U.S. Pat. No. 4,349,415 discloses a process for separating organic liquid solutes from their solvent mixtures, wherein the extractant can be carbon dioxide used in the supercritical state.

SUMMARY

A carbon dioxide recovery process for supercritical extraction is provided comprising:

providing a process stream from a supercritical extraction procedure wherein the process stream includes pressurized carbon dioxide, extraction process waste and optionally at least one co-solvent;

reducing the pressure of the process stream below critical pressure;

venting low pressure carbon dioxide vapor to exhaust;

cooling the process stream to form a two phase mixture;

separating the two phase mixture into a process liquid, containing co-solvent if present, and a process vapor phase stream;

collecting the process liquid;

filtering the process vapor phase stream to remove particulates and optionally residual co-solvent;

passing the filtered process vapor stream through an adsorber to remove trace impurities to form a purified carbon dioxide vapor stream; and, drying the purified carbon dioxide vapor stream to remove residual water vapor.

The process may further comprise optionally supplementing the dried, purified carbon dioxide vapor stream with a distilled carbon dioxide vapor stream to form a feed carbon dioxide vapor stream; filtering the feed carbon dioxide vapor stream to remove condensable vapors and particulates; and cooling the filtered feed carbon dioxide stream to form an intermediate carbon dioxide liquid stream.

The process may still further comprise filtering the intermediate carbon dioxide liquid stream; and pressurizing the intermediate carbon dioxide liquid stream. A supercritical fluid may be formed from the pressurized carbon dioxide liquid stream and delivered to the extraction procedure.

In one embodiment, wherein the adsorber is a plurality of adsorber beds, the process may further comprise isolating at least one adsorber bed and flushing the isolated adsorber bed with vaporized refrigerant from at least one condenser.

In another embodiment, a process for carbon dioxide supercritical extraction and recovery is provided comprising:

distilling a feed stream comprising carbon dioxide vapor off of a liquid carbon dioxide supply;

filtering the feed carbon dioxide vapor stream to remove condensable vapors and particulates;

cooling the filtered feed carbon dioxide stream to form an intermediate carbon dioxide liquid stream;

filtering the intermediate carbon dioxide liquid stream;

pressurizing the intermediate carbon dioxide liquid stream;

forming a supercritical fluid from the pressurized carbon dioxide liquid stream and delivering the supercritical fluid and optionally a co-solvent for a supercritical extraction procedure;

obtaining a process stream from the supercritical extraction procedure wherein the process stream includes pressurized carbon dioxide, extraction process waste and optionally at least one co-solvent;

reducing the pressure of the process stream below critical pressure;

venting low pressure carbon dioxide vapor to exhaust;

cooling the process stream to form a two phase mixture;

separating the two phase mixture into a process liquid, containing co-solvent if present, and a process vapor phase stream;

collecting the process liquid;

filtering the process vapor phase stream to remove particulates and optionally residual co-solvent;

passing the filtered process vapor stream through an adsorber to remove trace impurities to form a purified carbon dioxide vapor stream;

drying the purified carbon dioxide vapor stream to remove residual water vapor; and, optionally supplementing the dried, purified carbon dioxide vapor stream with additional distilled carbon dioxide vapor.

An apparatus is provided for the recovery of carbon dioxide from a supercritical extraction process producing a process stream containing pressurized liquid carbon dioxide, extraction process waste and optionally at least one co-solvent, comprising means for reducing the pressure of the liquid carbon dioxide; and a vent for passing low pressure carbon dioxide vapor resulting from the pressure reduction to exhaust; characterized by further comprising:

a separator for forming the process stream into two phases comprising a process liquid, containing co-solvent if present, and a process vapor phase stream;

a container for collecting the process liquid;

at least one filter to remove particulates and optionally residual co-solvent from the process vapor phase stream;

an adsorber to remove trace impurities from the filtered process vapor stream to form a purified carbon dioxide vapor stream;

at least one dryer to remove residual water vapor from the purified carbon dioxide vapor stream;

a flow network having conduits connecting the components of the apparatus;

the conduits of the flow network including a connection between the at least one dryer and a condenser associated with a supply of carbon dioxide to the extraction process; and, the flow network having valves associated with said conduits to allow for isolation of components of the apparatus.

In certain embodiments, the separator is a second condenser for cooling the process stream to form the two phases. In certain embodiments, the adsorber is a plurality of adsorber beds. In certain embodiments, at least one condenser includes an external refrigeration circuit having a heat exchanger to condense the purified carbon dioxide vapor feed stream through indirect heat exchange with a refrigerant stream. In certain of those embodiments, a conduit is provided between the refrigeration circuit and the adsorber to permit used refrigerant to flush out at least one adsorber bed when isolated from the apparatus.

In another embodiment, an apparatus is provided for the supply and recovery of carbon dioxide for a supercritical extraction process comprising:

a bulk liquid carbon dioxide supply tank for distilling off a feed stream comprising carbon dioxide vapor;

at least one purifying filter to remove condensable vapors and particulates from the carbon dioxide vapor feed stream;

a first condenser for condensing the carbon dioxide vapor feed stream into an intermediate liquid carbon dioxide stream;

a low pressure accumulation vessel for accumulating the intermediate liquid carbon dioxide stream;

at least one particle filter to remove particulates from the intermediate liquid carbon dioxide stream;

means for pressurizing the intermediate liquid carbon dioxide stream to form a pressurized liquid carbon dioxide stream;

a high-pressure accumulation vessel for accepting the pressurized liquid carbon dioxide stream;

a supercritical extraction apparatus for receiving the pressurized liquid carbon dioxide stream and optionally a co-solvent, for carrying out the supercritical extraction and providing a process stream comprising pressurized liquid carbon dioxide, extraction process waste and optionally the at least one co-solvent;

means for reducing the pressure of the liquid carbon dioxide;

a vent for passing low pressure carbon dioxide vapor resulting from the pressure reduction to exhaust;

a separator for forming the process stream into two phases comprising a process liquid, containing co-solvent if present, and a process vapor phase stream;

a container for collecting the process liquid;

at least one filter to remove particulates and optionally residual co-solvent from the process vapor phase stream;

an adsorber to remove trace impurities from the filtered process vapor stream to form a purified carbon dioxide vapor stream;

at least one dryer to remove residual water vapor from the purified carbon dioxide vapor stream;

a flow network having conduits connecting the components of the apparatus;

the conduits of said flow network including a vapor vent line from the low pressure accumulation vessel to the condenser to facilitate introduction of the intermediate liquid carbon dioxide stream into the low pressure accumulation vessel;

the conduits of the flow network including a connection between the at least one dryer and the at least one purifying filter upstream from the first condenser; and, the flow network having valves associated with said conduits to allow for isolation of components of the apparatus.

DETAILED DESCRIPTION

Figure 1:
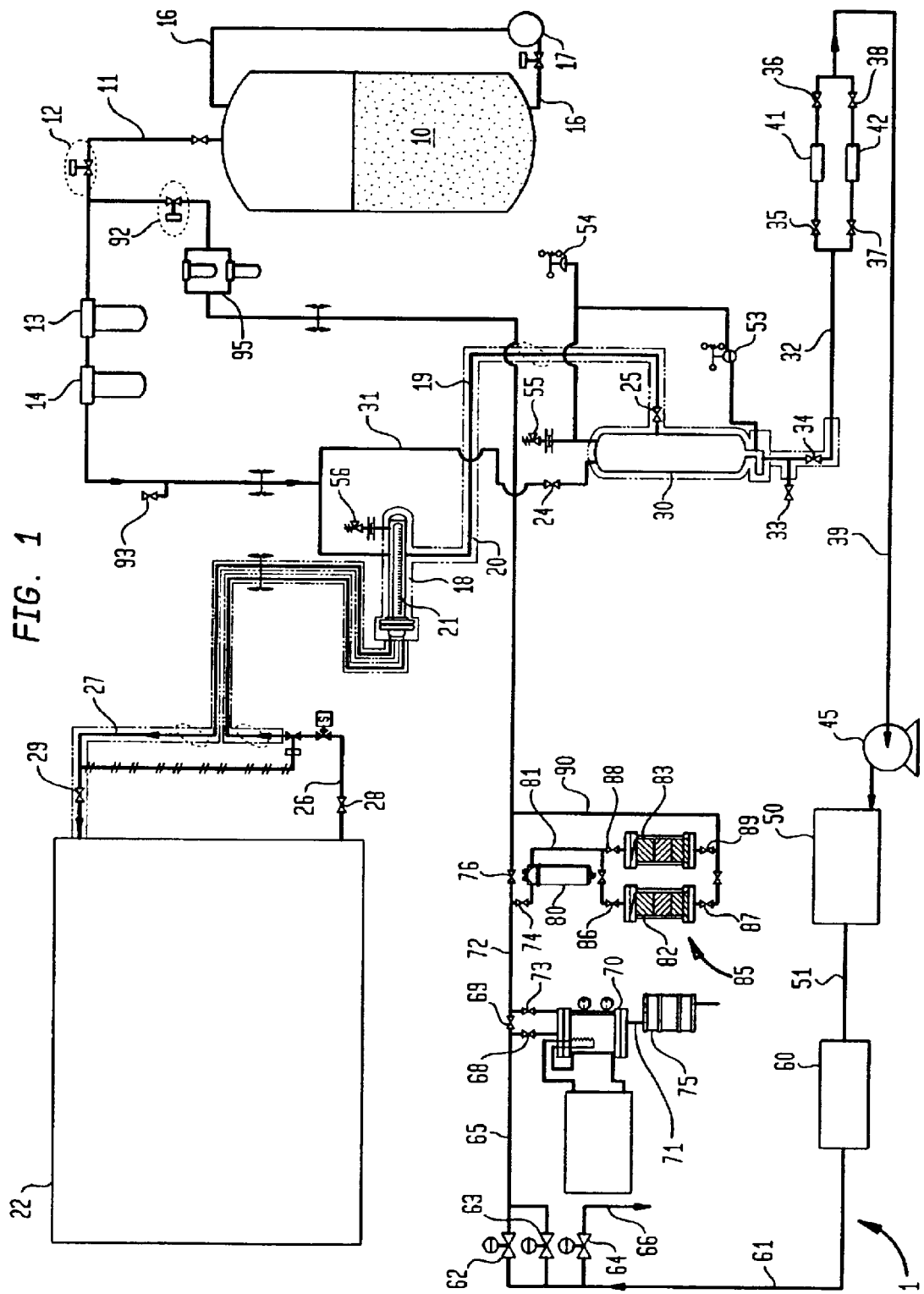
FIG. 1 is a schematic view of an apparatus for carrying out a supercritical extraction and recovery process.

Although the subject apparatus and process are applicable to many processes for making industrial products which must be cleaned during or after production, for convenience the apparatus and process will be exemplified with respect to their use in connection with semiconductor wafer processing. According to a process for cleaning an industrial product, such as a semiconductor wafer, with supercritical carbon dioxide ($SCCO_2$) and a co-solvent, and recovering the carbon dioxide (CO2) for recycle, an apparatus and process are provided including introducing a feed stream comprising carbon dioxide vapor into a purifying filter, such as for carrying out gas phase purification; condensing the purified $CO_2$ stream, such as by use of mechanical refrigeration or cryogenic refrigerants, and compressing and heating the purified $CO_2$ to achieve the supercritical state.

After the high purity, supercritical $CO_2$ stream has gone through the wafer production process, the supercritical waste stream (which may contain co-solvent and impurities removed from the wafers) is depressurized and cooled such as by using mechanical or cryogenic refrigerants to form a two-phase mixture, with the majority of the impurities being in the liquid phase. The phase separation results in a vapor phase that contains primarily $CO_2$ with trace amounts of impurities. The vapor phase is passed through an adsorption system such that the trace impurities are removed. The now purified $CO_2$ stream is cooled to a temperature such that the $CO_2$ is entirely condensed, and the purified liquid $CO_2$ is returned to a storage tank or low pressure accumulator.

The goal for wafer cleaning is to remove all surface contaminants or residue, such as particles, organics, metallics and native oxides. Throughout certain wafer fabrication processes, it is estimated that the surface of an individual wafer is cleaned up to 100 times. The wafers are treated with supercritical fluids to clean, strip solvents or photo-resist resins, dehydrate or otherwise treat the wafers or structures on the wafers.

The semiconductor wafer to be processed, or cleaned, is contacted with supercritical $CO_2$ ($SCCO_2$) directly in a processing chamber, such that the target residue dissolves in the $SCCO_2$ or in the $SCCO_2$ and a co-solvent. Between about 2% to about 50% by weight of organic co-solvents, such as ethanol, methanol, are often dissolved in the $SCCO_2$ to increase the solubility of the residue in $SCCO_2$. This dissolution may be carried out at pressures over 100 bar and temperatures between approximately 40° C. and 200° C.

The dissolved mixture is transferred to another vessel where the pressure and temperature are reduced, causing the residue material and co-solvent to condense out as a waste stream. Co-solvent material can be recovered using standard distillation methods. The $CO_2$-soluble co-solvent mixture is exhausted as a vent stream.

With reference to FIG. 1, a carbon dioxide recovery and supply apparatus is shown generally at 1. From a bulk supply of liquid carbon dioxide 10, a feed stream 11 comprising carbon dioxide vapor is distilled in a first purification stage, and is introduced into a purifying filter 13 and a particle filter 14 which can be any of a number of known, commercially available filters, for a second stage purification. The first filter 13 may be a coalescing filter to remove condensable hydrocarbons. A single adsorber bed, including activated carbon, alumina, and carbon molecular sieve material may remove additional amounts of hydrocarbon impurities.

Valve 12 is provided to isolate the bulk $CO_2$ supply 10. The bulk supply 10 may be a tank of liquid $CO_2$ maintained at about 300 psig (2.1 MPa) and about 0° F. (−18° C.). As carbon dioxide vapor is drawn out of the bulk supply tank, a portion of the liquid carbon dioxide in the bulk tank is drawn through conduit 16 and introduced to a pressure build device 17 such as an electric or steam vaporizer or the like, to maintain the pressure relatively constant within the bulk supply tank even though carbon dioxide vapor is being removed. The vaporizer takes liquid $CO_2$ from the supply tank and uses heat to change the $CO_2$ from the liquid phase to the gas phase. The resulting $CO_2$ gas is introduced back into the headspace of the supply tank.

The feed stream 11 after having been purified in the second stage is introduced into a condenser 18 that is provided with a heat exchanger 21 to condense the carbon dioxide vapor into a liquid 19. Such condensation is effected by an external refrigeration unit 22 that circulates a refrigeration stream through the heat exchanger, preferably of shell and tube design. Isolation valves 28 and 29 can be provided to isolate refrigeration unit 22 and its refrigerant feed line 26 and return line 27.

The liquid carbon dioxide is temporarily stored in a receiver vessel 30, that is, a low pressure accumulation vessel. The level of liquid in the low pressure accumulation receiver vessel 30 is controlled by a level sensor 53 (such as a level differential pressure transducer) which monitors the level of liquid carbon dioxide and a pressure sensor 54 (such as a pressure transducer) which monitors the pressure within the receiver vessel 30, via a controller (not shown, such as a programmable logic computer).

An intermediate liquid stream comprising high purity $CO_2$ liquid 19 is introduced from the receiver vessel 30 into a high-pressure accumulation vessel 50 after further purification and pressurization. The intermediate liquid carbon dioxide from the receiver vessel 30 travels through outlet conduit 32 and is again purified in a further purification stage by one of two particle filters 41 and 42. The particle filters 41 and 42 can be isolated by valves 35,36 and 37,38 respectively, so that one filter can be operational while the other filter is isolated from the conduit by closure of its respective valves, for cleaning or replacement. The low pressure, purified intermediate liquid carbon dioxide stream 39 emerges from the final filtration stage for pressurization, such as by a compressor 45, and storage in the high pressure accumulation vessel 50 prior to use in the desired process as described above.

A valve network controls the flow within the apparatus. In this regard, fill control valve 25 controls the flow of the intermediate liquid stream from the condenser 18 to the receiver vessel 30. Control of the flow of the low pressure intermediate liquid carbon dioxide stream through outlet conduit 32 is effected by product control valve 34. Drain valve 33 also is connected to outlet conduit 32 for sampling or venting, as needed. The venting of the low-pressure accumulation receiver vessel 30 via vent line (conduit) 31 to the condenser 18 is controlled by vent control valve 24.

An insulation jacket 20, such as one formed of polyurethane or the equivalent, can be disposed about the condenser 18, the conduit for carrying the liquid $CO_2$ 19, the receiver vessel 30, and the outlet conduit 32 and associated valves to maintain the desired temperature of the liquid $CO_2$.

The liquid $CO_2$ in the high pressure accumulation vessel 50 may be stored on the order of 300 bar (30 MPa) pressure and 80° C., that is, above the critical pressure (7.38 MPa) and critical temperature (31.1° C.) for carbon dioxide. Upon demand, the high purity supercritical carbon dioxide 51 is dispensed into a cleaning chamber 60 for the industrial part, such as semiconductor wafers, together with at least one co-solvent for the residue to be removed from the wafers.

After the high purity supercritical $CO_2$ stream has gone through the wafer production or cleaning process, the supercritical waste stream 61 is depressurized and passed through redundant valves 62, 63 to form a $CO_2$/co-solvent stream 65 on the order of about 25 bar (2.5 MPa) pressure and 50° C. Low pressure $CO_2$ vapor 66 can be sent to a scrubber via valve 64. The $CO_2$/co-solvent stream 65 passes through valve 68 to be cooled using mechanical or cryogenic refrigerants in a condenser 70 to form a two-phase mixture, with the majority of impurities being in the primarily co-solvent liquid phase 71 that is collected in receiver 75. Conventional coolers, condensers and phase separators may be used for the vapor cooling and phase separation.

After the phase separation, the vapor phase stream 72 (now on the order of about 25 bar (2.5 MPa) pressure and 5° C.) containing primarily $CO_2$ with trace amounts of impurities, passes through valves 73,74 to a filter 80 using a temperature controlled, packed column operating at a temperature close to the saturation temperature for $CO_2$ at the given pressure. Residual co-solvent (such as ethanol, etc.) and solid waste material cleaned off of the industrial part, such as target semiconductor wafer (i.e. photomask, etching chemicals, etc. used in the manufacture of semiconductor wafers) is removed from the carbon dioxide vapor phase stream.

The filtered vapor phase 81 is passed through an adsorption bed system 85 such that trace impurities are removed. The adsorption beds may contain activated carbon, alumina, or carbon molecular sieve material. For the separation of trace impurities, a 2-bed adsorption system 85 operated in a cyclic manner can be used. Each adsorption bed 82,83 can have a plurality of layers of adsorbents to ensure that all trace impurities are substantially removed. The purified $CO_2$ stream 90 is recovered, to be converted to a high-pressure product. When one adsorption bed 82 is saturated with trace impurities, the $CO_2$ stream is switched by closing valves 86 and 87 to the clean adsorption bed 83 by opening valves 88 and 89. In one embodiment, a portion of the vaporized refrigerant from a condenser, such as nitrogen or another disposable refrigerant, can be used as a purge for regeneration of the dirty adsorption bed at low pressures. The purged impurities from the adsorption bed, such as the co-solvent, can be recovered separately, if desired.

The purified CO2 stream 90 is dried to remove residual water vapor, such as by being passed through a two bed desiccant dryer 95. The purified stream can supplement or replace the first stage purity CO2 stream 11 from the bulk supply by the action of valves 92 and 12. The purified $CO_2$ vapor passes through filters 13 and 14 as described above, and is cooled in the condenser 18 to a temperature such that the $CO_2$ is entirely condensed and returned to the low pressure accumulation vessel 30.

EXAMPLE

A semiconductor wafer is processed using a mixture of supercritical $CO_2$ and 10% organic co-solvent. Residue removed from the wafer precipitates out as the pressure of the gas is reduced from about 300 bar (30 MPa) to about 25 to about 30 bar (2.5 to 3 MPa). The temperature of the gas at this stage is between about 30° to about 60° C. This $CO_2$ gas (containing 5% by weight organic co-solvent) is cooled to temperatures between about −10° C. and −5° C. A vapor-liquid phase system is formed where a majority of the organic co-solvents and other impurities are present in the liquid phase. The vapor phase contains about 300–1000 ppm of organic co-solvent material. The liquid phase is separated by gravity in a settling chamber, and the vapor phase is transported to an adsorbent bed containing an organic polar molecule-selective adsorbent. Activated alumina is suitable for this separation.

Additional adsorbents, such as activated carbons and molecular sieves, may also be present to adsorb any other trace organic impurities. The clean $CO_2$, recovered at about 20 bar pressure (2 MPa) is then cooled to about −20° C. and liquefied. The liquefied $CO_2$ product is returned to the $CO_2$ accumulator tank. About 90% of the $CO_2$ is recovered by this process. The additional 10% requirement can be obtained from the bulk $CO_2$ supply as described above.

The present apparatus and process are advantageous over prior systems because they provide for the removal of trace contaminants without a major change in operation procedure, by changing adsorbents as compared to requiring distillation of $CO_2$/so-solvent (such as ethanol) mixtures. The provide for cyclic operation, i.e., they do not require continuous feed for operation. Further, they provide a more economical design and operation, due to the absence of unnecessary accessory equipment such as boilers and condensers.

The entire process may be controlled by a programmable controller, and records data from the process can be sent to a computer which can be used to retrieve the data remotely. The apparatus and process may include a fully automated microprocessor controller which continuously monitors system operation providing fault detection, pressure control and valve sequencing, ensuring purifier reliability, while minimizing operator involvement.

By way of example and not limitation, level sensor 53, pressure sensor 54, and temperature sensors can provide information for the controller, in order to provide instructions to flow control valves 12, 24, 25, 34, and 92, or safety relief valves 55 and 56. Isolation bypass valves 69 and 76 may be controlled automatically or manually. The valves in the apparatus may be actuated pneumatically, by pulling a tap off of the $CO_2$ vapor conduit such as at valve 93, to supply gas for valve actuation.

The apparatus may include system alarms to detect potential hazards, such as temperature or pressure excursions, to ensure system integrity. Alarm and warning conditions may be indicated at the operator interface and may be accompanied by an alarm beeper.

It will be understood that the embodiment(s) described herein is/are merely exemplary and that a person skilled in the art may make many variations and modifications without departing from the spirit and scope of the invention. All such modifications and variations are intended to be included within the scope of the invention as described herein. It should be understood that any embodiments described above are not only in the alternative, but can be combined.

We claim:

1. A carbon dioxide recovery process for supercritical extraction comprising:

providing a process stream from a supercritical extraction procedure wherein the process stream includes pressurized carbon dioxide, extraction process waste and optionally at least one co-solvent;

reducing the pressure of the process stream below critical pressure;

venting low pressure carbon dioxide vapor to exhaust;

cooling the process stream to form a two phase mixture;

separating the two phase mixture into a process liquid, containing co-solvent if present, and a process vapor phase stream;

collecting the process liquid;

filtering the process vapor phase stream to remove particulates and optionally residual co-solvent;

passing the filtered process vapor stream through an adsorber to remove trace impurities to form a purified carbon dioxide vapor stream; and, drying the purified carbon dioxide vapor stream to remove residual water vapor.

2. The process of claim 1 further comprising:

optionally supplementing the dried, purified carbon dioxide vapor stream with a distilled carbon dioxide vapor stream to form a feed carbon dioxide vapor stream;

filtering the feed carbon dioxide vapor stream to remove condensable vapors and particulates; and, cooling the filtered feed carbon dioxide stream to form an intermediate carbon dioxide liquid stream.

3. The process of claim 2 further comprising:

filtering the intermediate carbon dioxide liquid stream; and pressurizing the intermediate carbon dioxide liquid stream.

4. The process of claim 3 further comprising forming a supercritical fluid from the pressurized carbon dioxide liquid stream and delivering the supercritical fluid to the extraction procedure.

5. The process of claim 1 wherein the adsorber is a plurality of adsorber beds, further comprising isolating at least one adsorber bed and flushing the isolated adsorber bed with vaporized refrigerant from at least one condenser.

6. A process for carbon dioxide supercritical extraction and recovery comprising:

distilling a feed stream comprising carbon dioxide vapor off of a liquid carbon dioxide supply;

filtering the feed carbon dioxide vapor stream to remove condensable vapors and particulates;

cooling the filtered feed carbon dioxide stream to form an intermediate carbon dioxide liquid stream;

filtering the intermediate carbon dioxide liquid stream;

pressurizing the intermediate carbon dioxide liquid stream;

forming a supercritical fluid from the pressurized carbon dioxide liquid stream and delivering the supercritical fluid and optionally a co-solvent for a supercritical extraction procedure;

obtaining a process stream from the supercritical extraction procedure wherein the process stream includes pressurized carbon dioxide, extraction process waste and optionally at least one co-solvent;

reducing the pressure of the process stream below critical pressure;

venting low pressure carbon dioxide vapor to exhaust;

cooling the process stream to form a two phase mixture;

separating the two phase mixture into a process liquid, containing co-solvent if present, and a process vapor phase stream;

collecting the process liquid;

filtering the process vapor phase stream to remove particulates and optionally residual co-solvent;

passing the filtered process vapor stream through an adsorber to remove trace impurities to form a purified carbon dioxide vapor stream;

drying the purified carbon dioxide vapor stream to remove residual water vapor; and, optionally supplementing the dried, purified carbon dioxide vapor stream with additional distilled carbon dioxide vapor.

7. An apparatus for the recovery of carbon dioxide from a supercritical extraction process producing a process stream comprising pressurized liquid carbon dioxide, extraction process waste and optionally at least one co-solvent, comprising means for reducing the pressure of the liquid carbon dioxide; and a vent for passing low pressure carbon dioxide vapor resulting from the pressure reduction to exhaust; characterized by further comprising:

a separator for forming the process stream into two phases comprising a process liquid, containing co-solvent if present, and a process vapor phase stream;

a container for collecting the process liquid;

at least one filter to remove particulates and optionally residual co-solvent from the process vapor phase stream;

an adsorber to remove trace impurities from the filtered process vapor stream to form a purified carbon dioxide vapor stream;

at least one dryer to remove residual water vapor from the purified carbon dioxide vapor stream;

a flow network having conduits connecting the components of the apparatus;

the conduits of the flow network including a connection between the at least one dryer and a condenser associated with a supply of carbon dioxide to the extraction process; and, the flow network having valves associated with said conduits to allow for isolation of components of the apparatus.

8. The apparatus of claim 7 wherein the separator is a second condenser for cooling the process stream to form the two phases.

9. The apparatus of claim 7, wherein the adsorber is a plurality of adsorber beds.

10. The apparatus of claim 7, wherein at least one condenser includes an external refrigeration circuit having a heat exchanger to condense the purified carbon dioxide vapor feed stream through indirect heat exchange with a refrigerant stream.

11. The apparatus of claim 10 wherein a conduit is provided between the refrigeration circuit and the adsorber to permit used refrigerant to flush out at least one adsorber bed when isolated from the apparatus.

12. An apparatus for the supply and recovery of carbon dioxide for a supercritical extraction process comprising:

a bulk liquid carbon dioxide supply tank for distilling off a feed stream comprising carbon dioxide vapor;

at least one purifying filter to remove condensable vapors and particulates from the carbon dioxide vapor feed stream;

a first condenser for condensing the carbon dioxide vapor feed stream into an intermediate liquid carbon dioxide stream;

a low pressure accumulation vessel for accumulating the intermediate liquid carbon dioxide stream;

at least one particle filter to remove particulates from the intermediate liquid carbon dioxide stream;

means for pressurizing the intermediate liquid carbon dioxide stream to form a pressurized liquid carbon dioxide stream;

a high-pressure accumulation vessel for accepting the pressurized liquid carbon dioxide stream;

a supercritical extraction apparatus for receiving the pressurized liquid carbon dioxide stream and optionally a co-solvent, for carrying out the supercritical extraction and providing a process stream comprising pressurized liquid carbon dioxide, extraction process waste and optionally the at least one co-solvent;

means for reducing the pressure of the liquid carbon dioxide;

a vent for passing low pressure carbon dioxide vapor resulting from the pressure reduction to exhaust;

a separator for forming the process stream into two phases comprising a process liquid, containing co-solvent if present, and a process vapor phase stream;

a container for collecting the process liquid;

at least one filter to remove particulates and optionally residual co-solvent from the process vapor phase stream;

an adsorber to remove trace impurities from the filtered process vapor stream to form a purified carbon dioxide vapor stream;

at least one dryer to remove residual water vapor from the purified carbon dioxide vapor stream;

a flow network having conduits connecting the components of the apparatus;

the conduits of said flow network including a vapor vent line from the low pressure accumulation vessel to the condenser to facilitate introduction of the intermediate liquid carbon dioxide stream into the low pressure accumulation vessel;

the conduits of the flow network including a connection between the at least one dryer and the at least one purifying filter upstream from the first condenser; and, the flow network having valves associated with said conduits to allow for isolation of components of the apparatus.

13. The apparatus of claim 12 wherein the separator is a second condenser for cooling the process stream to form the two phases.

14. The apparatus of claim 12, wherein the adsorber is a plurality of adsorber beds.

15. The apparatus of claim 12, wherein at least one condenser includes an external refrigeration circuit having a heat exchanger to condense the vapor feed stream through indirect heat exchange with a refrigerant stream.

16. The apparatus of claim 15 wherein a conduit is provided between the refrigeration circuit and the adsorber to permit used refrigerant to flush out at least one adsorber bed when isolated from the apparatus.

* * * * *